United States Patent
Zhu et al.

(10) Patent No.: US 10,464,633 B2
(45) Date of Patent: Nov. 5, 2019

(54) ELECTRIC VEHICLE AND DRIVING SYSTEM FOR ELECTRIC VEHICLE

(71) Applicant: Robert Bosch GmbH, Stuttgart (DE)

(72) Inventors: Tao Zhu, Shanghai (CN); Weiya Li, Shanghai (CN); Qilin Huang, Shanghai (CN); Xiaoyun Zang, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/737,800

(22) PCT Filed: Jun. 19, 2015

(86) PCT No.: PCT/CN2015/081968
§ 371 (c)(1),
(2) Date: Dec. 19, 2017

(87) PCT Pub. No.: WO2016/201705
PCT Pub. Date: Dec. 22, 2016

(65) Prior Publication Data
US 2019/0002056 A1    Jan. 3, 2019

(51) Int. Cl.
*B62M 7/12* (2006.01)
*B60K 7/00* (2006.01)
(Continued)

(52) U.S. Cl.
CPC ............ *B62M 7/12* (2013.01); *B60K 7/0007* (2013.01); *B62K 25/283* (2013.01); *B62M 11/02* (2013.01);
(Continued)

(58) Field of Classification Search
CPC . B60K 1/00; B60K 1/02; B60K 17/16; B60K 17/12; B60K 2001/001; B60K 6/26;
(Continued)

(56) References Cited

U.S. PATENT DOCUMENTS 5,163,528 A * 11/1992 Kawamoto .......... B60K 7/0007
180/65.51
6,199,652 B1 * 3/2001 Mastroianni ......... B60K 7/0007
180/229
(Continued)

FOREIGN PATENT DOCUMENTS

CN    101513821    8/2009
CN    101856948 A  10/2010
(Continued)

OTHER PUBLICATIONS

International Search Report for Application No. PCT/CN2015/081968 dated Mar. 10, 2016 (2 pages).

*Primary Examiner* — John D Walters
(74) *Attorney, Agent, or Firm* — Michael Best & Friedrich LLP

(57) ABSTRACT

A driving system for an electric vehicle comprises a motor (3) comprising a first output shaft (11) and a gearbox (17) comprising a second output shaft (27) attachable to a wheel (33) of the electric vehicle. The first output shaft (11) is capable of driving the second output shaft (27) to rotate by engagement of gears of the gearbox (17). The first output shaft (11) is hollow, and the second output shaft (27) extends through the first output shaft (11) so that the second output shaft (27) is disposed coaxially with the first output shaft (11). An electric vehicle comprising the driving system is disclosed. The driving system is possible to improve the balancing, the passing ability and the visual appearance of the electric vehicle.

18 Claims, 3 Drawing Sheets

(51) Int. Cl.
| | |
|---|---|
| *H02K 7/116* | (2006.01) |
| *H02K 7/00* | (2006.01) |
| *B62K 25/28* | (2006.01) |
| *B62M 11/02* | (2006.01) |
| *F16H 1/20* | (2006.01) |
| *F16H 57/025* | (2012.01) |
| *F16H 57/031* | (2012.01) |
| *H02K 5/04* | (2006.01) |
| *B62K 25/26* | (2006.01) |
| *F16H 57/02* | (2012.01) |

(52) U.S. Cl.
CPC .............. *F16H 1/20* (2013.01); *F16H 57/025* (2013.01); *F16H 57/031* (2013.01); *H02K 5/04* (2013.01); *H02K 7/006* (2013.01); *H02K 7/116* (2013.01); *B60K 2007/0038* (2013.01); *B60K 2007/0092* (2013.01); *B62K 25/26* (2013.01); *B62K 2204/00* (2013.01); *F16H 2057/02034* (2013.01); *H02K 7/003* (2013.01); *Y02T 10/641* (2013.01)

(58) Field of Classification Search
CPC .......... B60K 6/40; B60K 6/46; B60K 7/0007; F16H 57/0427; F16H 57/0483; F16H 1/20; F16H 57/025; F16H 57/031; H02K 16/02; H02K 7/116; H02K 7/003; H02K 5/10; H02K 5/04; H02K 7/006; B62M 6/40; B62M 7/12; B62M 11/02; B62K 25/283
USPC ...................................... 180/65.51
See application file for complete search history.

(56) References Cited

U.S. PATENT DOCUMENTS

| | | | | |
|---|---|---|---|---|
| 7,249,644 B2* | 7/2007 | Honda | B60K 1/00 | 180/65.51 |
| 7,766,778 B2* | 8/2010 | Tabata | B60K 6/405 | 475/5 |
| 8,102,087 B2* | 1/2012 | Yamamoto | B60K 6/445 | 310/83 |
| 8,636,095 B2* | 1/2014 | Ito | B62M 6/65 | 180/206.6 |
| 8,863,874 B2* | 10/2014 | Lee | B60K 7/0007 | 180/65.51 |
| 9,132,723 B2* | 9/2015 | Munster | B60K 7/0007 | |
| 9,415,691 B2* | 8/2016 | Murakami | B60L 7/18 | |
| 2006/0065452 A1* | 3/2006 | Tomoshige | B62M 6/65 | 180/65.1 |
| 2007/0068715 A1* | 3/2007 | Mizutani | B60G 3/20 | 180/65.51 |
| 2008/0070736 A1 | 3/2008 | Yoshino et al. | | |
| 2008/0093133 A1* | 4/2008 | Yogo | B60G 3/20 | 180/55 |
| 2008/0169141 A1* | 7/2008 | Suzuki | B60K 7/0007 | 180/65.7 |
| 2009/0025991 A1* | 1/2009 | Moriguchi | F16D 55/02 | 180/65.51 |
| 2010/0052442 A1* | 3/2010 | Savant | H02K 7/108 | 310/78 |
| 2010/0078248 A1* | 4/2010 | Kanno | B60K 7/0007 | 180/220 |
| 2010/0206649 A1* | 8/2010 | Ishii | B60K 6/26 | 180/65.31 |
| 2011/0011656 A1* | 1/2011 | Poulsen | B60K 6/26 | 180/65.25 |
| 2012/0161495 A1* | 6/2012 | Ito | B62M 6/65 | 301/6.5 |
| 2012/0190491 A1* | 7/2012 | Gunji | B60K 7/0007 | 475/5 |
| 2012/0244980 A1* | 9/2012 | Su | B60K 17/046 | 475/149 |
| 2012/0248850 A1* | 10/2012 | Hirano | B60K 7/0007 | 301/6.5 |
| 2013/0001952 A1* | 1/2013 | Paweletz | H02K 7/116 | 290/55 |
| 2013/0009449 A1* | 1/2013 | Ishizuka | B60K 17/043 | 301/6.5 |
| 2013/0009450 A1* | 1/2013 | Suzuki | B60K 7/0007 | 301/6.5 |
| 2013/0009451 A1* | 1/2013 | Nishikawa | B62K 11/04 | 301/6.5 |
| 2013/0048394 A1* | 2/2013 | Su | B60L 50/51 | 180/60 |
| 2013/0119748 A1* | 5/2013 | Yamamoto | B60K 7/0007 | 301/6.5 |
| 2013/0190961 A1* | 7/2013 | Yuan | H02K 51/00 | 701/22 |
| 2013/0241366 A1* | 9/2013 | Kim | H02K 3/28 | 310/67 R |
| 2013/0284526 A1* | 10/2013 | Kawasaki | B60K 7/0007 | 180/55 |
| 2013/0288841 A1* | 10/2013 | Yoshino | B60K 7/0007 | 475/149 |
| 2014/0041619 A1* | 2/2014 | Yamauchi | B60K 7/0007 | 123/196 R |
| 2014/0042796 A1 | 2/2014 | Park et al. | | |
| 2014/0070600 A1 | 3/2014 | Park | | |
| 2014/0145495 A1* | 5/2014 | Shin | B25J 5/007 | 301/6.5 |
| 2014/0152075 A1* | 6/2014 | Kanatani | B60K 7/0007 | 301/6.5 |
| 2015/0357873 A1* | 12/2015 | Battistella | H02K 5/04 | 310/67 R |
| 2015/0377334 A1* | 12/2015 | Swales | F16H 48/06 | 475/220 |
| 2016/0204679 A1* | 7/2016 | Yamada | H02K 1/32 | 310/45 |
| 2016/0355083 A1* | 12/2016 | Kuroda | F16C 19/186 | |
| 2017/0001513 A1* | 1/2017 | Kuroda | B60K 17/14 | |
| 2017/0057349 A1* | 3/2017 | Ogawa | B60K 17/16 | |
| 2017/0197502 A1* | 7/2017 | Yukishima | B60K 7/00 | |
| 2017/0197503 A1* | 7/2017 | Yukishima | B60K 7/00 | |
| 2017/0371331 A1* | 12/2017 | Cameron | B60K 7/0007 | |
| 2018/0015815 A1* | 1/2018 | Makino | B60L 15/20 | |
| 2018/0056767 A1* | 3/2018 | Dolgov | B60G 3/145 | |
| 2018/0056775 A1* | 3/2018 | Fukudome | B60K 7/0007 | |
| 2018/0201119 A1* | 7/2018 | Li | B60K 7/0007 | |

FOREIGN PATENT DOCUMENTS

| | | |
|---|---|---|
| CN | 102167129 | 8/2011 |
| CN | 102442395 A | 5/2012 |
| CN | 102951010 A | 3/2013 |
| CN | 103457407 | 12/2013 |
| CN | 103496317 A | 1/2014 |
| DE | 4410074 | 4/2003 |
| DE | 10163226 | 7/2003 |
| DE | 102007044078 A1 | 4/2009 |
| WO | 2009010943 A2 | 1/2009 |
| WO | 2013057466 | 4/2013 |

* cited by examiner

ELECTRIC VEHICLE AND DRIVING SYSTEM FOR ELECTRIC VEHICLE

BACKGROUND OF THE INVENTION

The invention relates to an electric vehicle, in particular to a driving system for an electric vehicle.

With heavier and heavier environmental pollution, people pay more and more attention to environmental protection. Electric vehicles use or mainly use electric power to drive its wheels to rotate. Thus, it is expected that electric vehicles will be more widely used in near future because they are more environmentally friendly than the conventional vehicles. A commonly used driving system for an electric vehicle generally comprises a motor and a gearbox. Specially, the motor drives a wheel of the electric vehicle by means of the gearbox.

It is well-known that there are two common driving systems for electric vehicle: planetary gear in-wheel driving system and near wheel driving system. In a planetary gear in-wheel driving system, both the motor and the gearbox are disposed inside of a rim of the wheel of the electric vehicle, and the gears of the gearbox are disposed around an output shaft of the motor. In a near wheel driving system, both the motor and the gearbox are disposed outside of a rim of the wheel of the electric vehicle, and the motor is disposed to be offset to the gearbox. Compared with the near wheel driving system, the planetary gear in-wheel driving system has a compact size by disposing the motor and the gearbox in the same housing and a good balancing by distributing symmetrically the weight of the gears of the gearbox about the output shaft of the motor. The near wheel driving system can produce larger power density due to improved cooling performance and achieve a high efficiency. The near wheel driving system is often selected for high power vehicles due to its larger power density. However, in the existing near wheel driving system, the motor and the gearbox are disposed to be offset to each other so that the balancing of the near wheel driving system and thus the vehicles is very poor, which further cause difficulty in controlling the vehicles and degradation in riding comfort. Further, in the near wheel driving system, the motor and the gearbox substantially protrude outside of the wheel, which adversely affects the passing ability and the visual appearance of the vehicle. These problems are more obvious for the near wheel driving system with larger power density due to an increased size of the motor, especially for the near wheel driving system designed for an electric motorcycle (also referred to an electric scooter).

Thus, there is a need to make improvements on the existing driving system for the electric vehicle.

SUMMARY OF THE INVENTION

An object of the present invention is to overcome at least one of the abovementioned defects of the existing driving system for the electric vehicle. To this end, the present invention provides a driving system for an electric vehicle which substantially improves the balancing, the passing ability and the visual appearance of the electric vehicle.

According to an aspect of the present invention, it is to provide a driving system for an electric vehicle comprising:
a motor comprising a first output shaft; and
a gearbox comprising a second output shaft attachable to a wheel of the electric vehicle, the first output shaft being capable of driving the second output shaft to rotate by engagement of gears of the gearbox;
wherein the first output shaft is hollow, and the second output shaft extends through the first output shaft so that the second output shaft is disposed coaxially with the first output shaft.

Preferably, the motor further comprises a motor housing, a stator disposed fixedly within the motor housing, and a rotor disposed rotatably within a central space defined by the stator, the first output shaft is fixed onto the rotor and supported rotatably by the motor housing to be rotatable with the rotor.

Preferably, the gearbox comprises a gearbox housing, at least two pair of gears engaged with each other and at least one transmission shaft supported rotatably by the gearbox housing, the first output shaft extends into the gearbox housing so that a gear having a smaller diameter of a first pair of gears of the at least two pair of gears is fixed onto the first output shaft, a gear having a larger diameter of a last pair of gears of the at least two pair of gears is fixed onto the second output shaft supported rotatably, and the other gears of the at least two pair of gears are fixed onto the at least one transmission shaft.

Preferably, the motor comprises a motor housing having a main body and an end cover attached to the main body, the gearbox comprises a gearbox housing having a main body and an end cover attached to the main body, and the main body of the motor housing and the main body of the gearbox housing are formed into an unitary unit or piece.

Preferably, the second output shaft is configured to be attached to a rim of the wheel by means of an adaptor, the rim and the gearbox are positioned either side of the motor so that the motor is at least partially positioned within a space defined by the rim when the driving system is attached to the rim.

Preferably, the rim is designed so that a majority of the motor is positioned within the space defined by the rim.

Preferably, an attachment point for attaching the driving system to a frame of the electric vehicle is formed on the gearbox.

According to another aspect of the present invention, it is to provide an electric vehicle comprises a driving system as stated.

Preferably, the electric vehicle is an electric motorcycle or an electric car.

These and other objects, features and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention.

DETAILED DESCRIPTION

Preferred embodiments of the present invention are described in detail with reference to illustrative examples hereinafter. For those skilled in the art, it should be understood that embodiments are only for the purpose of illustrating and are not to be construed as limiting the present invention.

Figure 1:
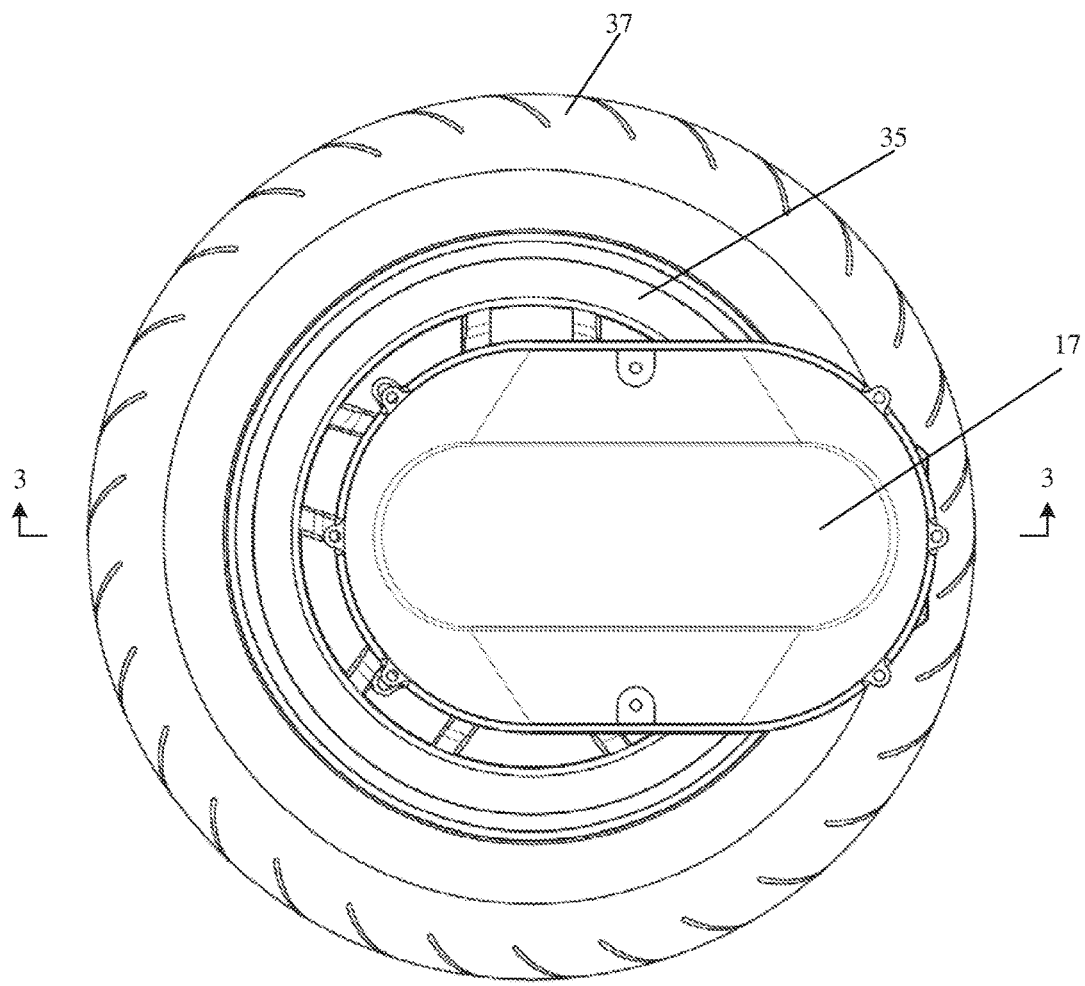
FIG. 1 is a side view showing schematically a driving system for an electric vehicle according to a preferred embodiment of the present invention being mounted onto a wheel of the electric vehicle.
Figure 2:
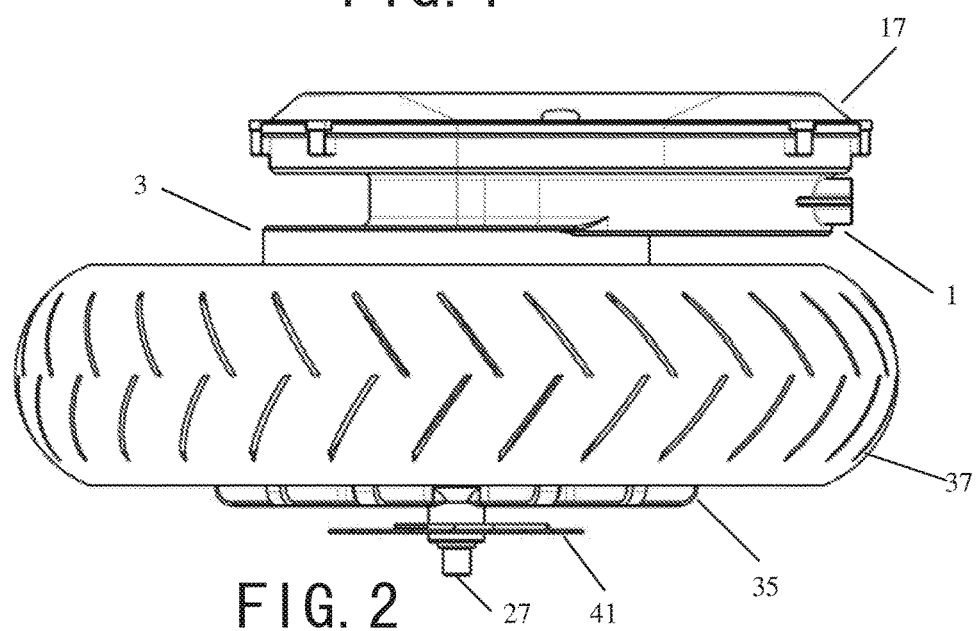
FIG. 2 is a bottom view of the driving system shown in FIG. 1.
Figure 3:
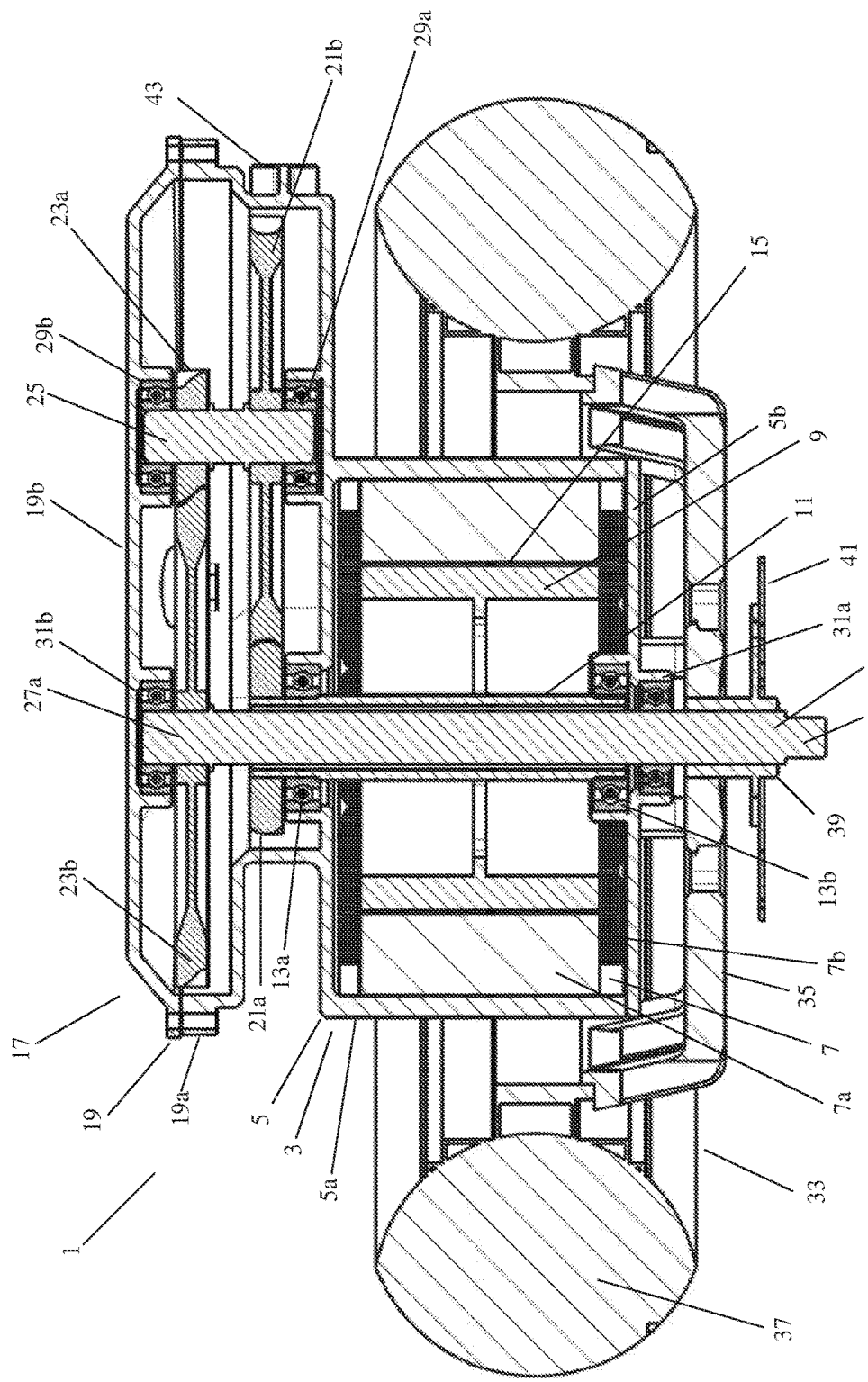
FIG. 3 is a sectional view taken along a line 3-3 of FIG. 1.

FIG. 1 is a side view showing schematically a driving system for an electric vehicle according to a preferred embodiment of the present invention being mounted onto a wheel of the electric vehicle, FIG. 2 is a bottom view of the driving system shown in FIG. 1, and FIG. 3 is a sectional view taken along a line 3-3 of FIG. 1. As shown in FIGS. 1-3, a driving system 1 for an electric vehicle according to a preferred embodiment of the present invention comprises a motor 3 having a motor housing 5, a stator 7 disposed fixedly within the motor housing 5, a rotor 9 disposed rotatably within the motor housing 5, and a first output shaft 11 rotatable with the rotor 9. The motor housing 5 comprises a main body 5a and an end cover 5b attached to the main body 5a. The stator 7 comprises a stator core 7a and a stator winding 7b wound on the stator core 7a. The first output shaft 11 is hollow, extends centrally through the rotor 9 and is fixed onto the rotor 9. The first output shaft 11 is supported rotatably at two ends by a first pair of bearings 13a, 13b disposed in the main body 5a and the end cover 5b of the motor housing 5 respectively so that the rotor 9 mounted fixedly onto the first output shaft 11 is disposed rotatably within a central space defined by the stator 7.

The driving system 1 for an electric vehicle according to a preferred embodiment of the present invention further comprises a gearbox 17 having a gearbox housing 19, a first pair of gears 21a, 21b engaged with each other, a second pair of gears 23a, 23b engaged with each other, a transmission shaft 25, and a second output shaft 27. Each of the pair of gears has different diameter to reduce a rotating speed of the second output shaft 27. The gearbox housing 19 comprises a main body 19a and an end cover 19b attached to the main body 19a. The first output shaft 11 of the motor 3 extends into the gearbox housing 19 so that a gear 21a having a smaller diameter of the first pair of gears 21a, 21b is fixed onto the first output shaft 11 of the motor 3. A gear 21b having a larger diameter of the first pair of gears 21a, 21b is fixed onto the transmission shaft 25 which is supported rotatably at two ends by a second pair of bearings 29a, 29b disposed in the main body 19a and the end cover 19b of the gearbox housing 19 respectively. A gear 23a having a smaller diameter of the second pair of gears 23a, 23b is also fixed onto the transmission shaft 25. The second output shaft 27 of the gearbox 17 extends through the first output shaft 11 of the motor 3 which is hollow so that the second output shaft 27 of the gearbox 17 is disposed coaxially with the first output shaft 11. The second output shaft 27 is supported rotatably at two ends by a third pair of bearings 31a, 31b disposed in the end cover 5b of the motor housing 5 and the end cover 19b of the gearbox housing 19 respectively. A gear 23b having a larger diameter of the second pair of gears 23a, 23b is fixed onto a first end 27a of the second output shaft 27. A second end 27b opposite to the first end 27a of the second output shaft 27 protrudes out of the first output shaft 11 of the motor 3.

The second end 27b of the second output shaft 27 may be attached to a wheel 33 of the electric vehicle. The wheel 33 comprises a rim 35 and a tire 37 which is fitted around the rim 33. The second end 27b of the second output shaft 27 is attached fixedly to the rim 35 by means of an adaptor 39. A disc brake 41 may be fitted onto the adaptor 39 to stop the wheel 33 by clamping the disc brake 41 with a braking clipper (not shown in the drawings). It should be understood that the disc brake 41 may be replaced with a drum brake or other braking system.

Although the motor housing 5 and the gearbox housing 19 may be formed separately from each other and then be assembled together, it is preferred that the main body 5a of the motor housing 5 and the main body 19a of the gearbox housing 19 are formed into an unitary unit or piece to simplify the assembling process and reduce the material and the cost. Further, in the preferred embodiment, the gearbox 17 is shown to include a two-stage reduction gear set. It should be understood that it is possible to use a more than two-stage reduction gear set. The first pair of gears 21a, 21b and the second pair of gears 23a, 23b may be any applicable gear pairs, for example helical gear pairs.

Figure 4:
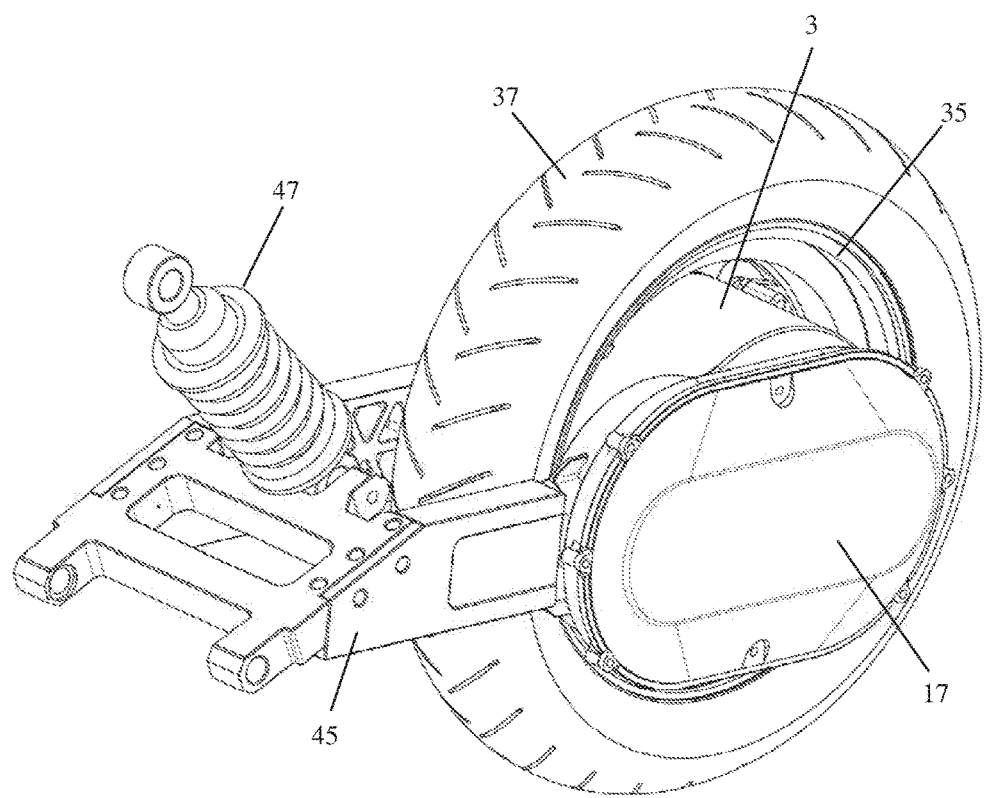
FIGS. 4 and 5 are perspective views showing schematically that a swing arm for attaching the wheel and the driving system to a frame of the electric vehicle is attached to the driving system shown in FIG. 1
Figure 5:
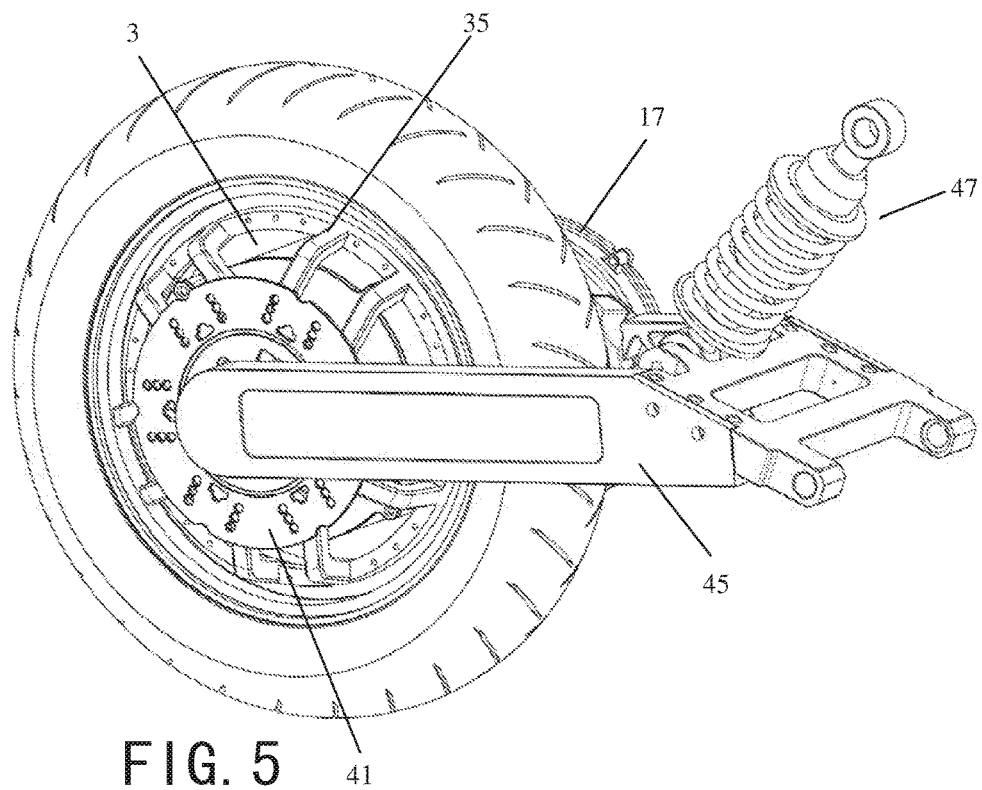

FIGS. 4 and 5 are perspective views showing schematically that a swing arm for attaching the wheel and the driving system to a frame of the electric vehicle is attached to the driving system shown in FIG. 1. In the example of FIGS. 4 and 5, the wheel and the driving system are shown to be attached to a frame (not shown in the drawings) of an electric motorcycle. A swing arm 45 for attaching the wheel and the driving system to the frame of the electric vehicle is fork-shaped. The rear end of fork-shaped swing arm 45 is attached at one side to an attachment point 43 formed on the gearbox 17 and at the other side to the second output shaft 27 by means of a support bearing (invisible in the drawings). The front end of fork-shaped swing arm 45 may be attached to the frame of the electric vehicle. A shock absorber 47 may be disposed between the fork-shaped swing arm 45 and the frame of the electric vehicle to damp the vibration during travelling of the vehicle. It should be understood that the driving system for the electric vehicle according to the present invention is applicable to the electric vehicle other than the electric motorcycle, for example an electric car.

The operation of the driving system 1 for the electric vehicle according to the present invention will be described in detail. When a current is supplied to the motor 3, the first output shaft 11 of the motor 3 rotates with the rotor 9. The first output shaft 11 of the motor 3 drives the transmission shaft 25 to rotate by means of engagement of the first pair of gears 21a, 21b. The transmission shaft 25 further drives the second output shaft 27 to rotate by means of engagement of the second pair of gears 23a, 23b. The second output shaft 27 attached fixedly to the rim 35 further drives the wheel 33 of the electric vehicle, thereby driving finally the electric vehicle to run a road.

As shown in FIG. 3, the second output shaft 27 of the gearbox 17 extends through the first output shaft 11 of the motor 3 so that the wheel 33 and the gearbox 17 are positioned either side of the motor 3, which causes a more uniform and symmetrical distribution of the weight of the driving system 1 attached to the wheel of the electric vehicle, thereby substantially improving the balancing of the driving system and thus the electric vehicle. The motor 3 is at least partially positioned within a space defined by the rim, which reduces the size of the electric vehicle fitted with the driving system according to the present invention, thereby improving the passing ability and the visual appearance of the electric vehicle. Even for a driving system with a large power density and an increased size, a majority of the motor of the driving system also may be positioned within the space defined by the rim by designing the shape of the rim.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A driving system (1) for an electric vehicle, the driving system comprising:
    a wheel rim rotatable about an axis, the wheel rim defining an interior space radially inside the rim within an axial extent of the rim;
    a motor (3) comprising a first output shaft (11); and
    a gearbox (17) comprising a second output shaft (27) drivingly attached to the wheel rim, the first output shaft (11) being capable of driving the second output shaft (27) to rotate by engagement of gears of the gearbox (17);
    wherein the first output shaft (11) is hollow, and the second output shaft (27) extends through the first output shaft (11) so that the second output shaft (27) is disposed coaxially with the first output shaft (11), and wherein the rim (35) and the gearbox (17) are positioned on opposite axial sides of the motor (3), and the motor (3) is at least partially positioned within the interior space defined by the rim (35).

2. The driving system (1) for the electric vehicle according to claim 1, wherein the motor (3) further comprises a motor housing (5), a stator (7) disposed fixedly within the motor housing (5), and a rotor (9) disposed rotatably within a central space defined by the stator (7), wherein the first output shaft (11) is fixed onto the rotor (9) and supported rotatably by the motor housing (5) to be rotatable with the rotor (9).

3. The driving system (1) for the electric vehicle according to claim 1, wherein the gearbox (17) comprises a gearbox housing (19), at least two pair of gears (21a, 21b, 23a, 23b) engaged with each other and at least one transmission shaft (25) supported rotatably by the gearbox housing (19), wherein the first output shaft (11) extends into the gearbox housing (19) so that a gear (21a) having a smaller diameter of a first pair of gears of the at least two pair of gears is fixed onto the first output shaft (11), a gear (23b) having a larger diameter of a last pair of gears of the at least two pair of gears is fixed onto the second output shaft (27) supported rotatably, and the other gears of the at least two pair of gears are fixed onto the at least one transmission shaft (25).

4. The driving system (1) for the electric vehicle according to claim 1, wherein the motor (3) comprises a motor housing (5) having a first main body (5a) and a first end cover (5b) attached to the first main body (5a), the gearbox (17) comprises a gearbox housing (19) having a second main body (19a) and a second end cover (19b) attached to the second main body (19a), and the first main body (5a) of the motor housing (5) and the second main body (19a) of the gearbox housing (19) are formed into a unitary unit or piece.

5. The driving system (1) for the electric vehicle according to claim 1, wherein the second output shaft (27) is attached to the wheel rim (35) by means of an adaptor (39).

6. The driving system (1) for the electric vehicle according to claim 1, wherein the wheel rim (35) is designed so that a majority of the motor (3) is positioned within the interior space defined by the wheel rim (35).

7. The driving system (1) for the electric vehicle according to claim 1, wherein an attachment point (43) for attaching the driving system (1) to a frame of the electric vehicle is formed on the gearbox (17).

8. An electric vehicle comprising a driving system (1) according to claim 1.

9. The electric vehicle according to claim 8, wherein the electric vehicle is an electric motorcycle.

10. The electric vehicle according to claim 8, wherein the electric vehicle is an electric car.

11. The electric vehicle according to claim 8, wherein the motor (3) further comprises a motor housing (5), a stator (7) disposed fixedly within the motor housing (5), and a rotor (9) disposed rotatably within a central space defined by the stator (7), wherein the first output shaft (11) is fixed onto the rotor (9) and supported rotatably by the motor housing (5) to be rotatable with the rotor (9).

12. The electric vehicle according to claim 8, wherein the gearbox (17) comprises a gearbox housing (19), at least two pair of gears (21a, 21b, 23a, 23b) engaged with each other and at least one transmission shaft (25) supported rotatably by the gearbox housing (19), wherein the first output shaft (11) extends into the gearbox housing (19) so that a gear (21a) having a smaller diameter of a first pair of gears of the at least two pair of gears is fixed onto the first output shaft (11), a gear (23b) having a larger diameter of a last pair of gears of the at least two pair of gears is fixed onto the second output shaft (27) supported rotatably, and the other gears of the at least two pair of gears are fixed onto the at least one transmission shaft (25).

13. The electric vehicle according to claim 8, wherein the motor (3) comprises a motor housing (5) having a first main body (5a) and a first end cover (5b) attached to the first main body (5a), the gearbox (17) comprises a gearbox housing (19) having a second main body (19a) and a second end cover (19b) attached to the second main body (19a), and the first main body (5a) of the motor housing (5) and the second main body (19a) of the gearbox housing (19) are formed into a unitary unit or piece.

14. The electric vehicle according to claim 8, wherein the second output shaft (27) is attached to the wheel rim (35) by means of an adaptor (39).

15. The electric vehicle according to claim 14, wherein the wheel rim (35) is designed so that a majority of the motor (3) is positioned within the interior space defined by the wheel rim (35).

16. The electric vehicle according to claim 8, further comprising a frame, wherein the driving system is attached to the frame at an attachment point (43) formed on the gearbox (17).

17. The electric vehicle according to claim 8, further comprising a wheel, wherein the wheel includes the wheel rim and a tire.

18. The driving system (1) for the electric vehicle according to claim 1, further comprising a wheel, wherein the wheel includes the wheel rim and a tire.

\* \* \* \* \*